Figure 1:
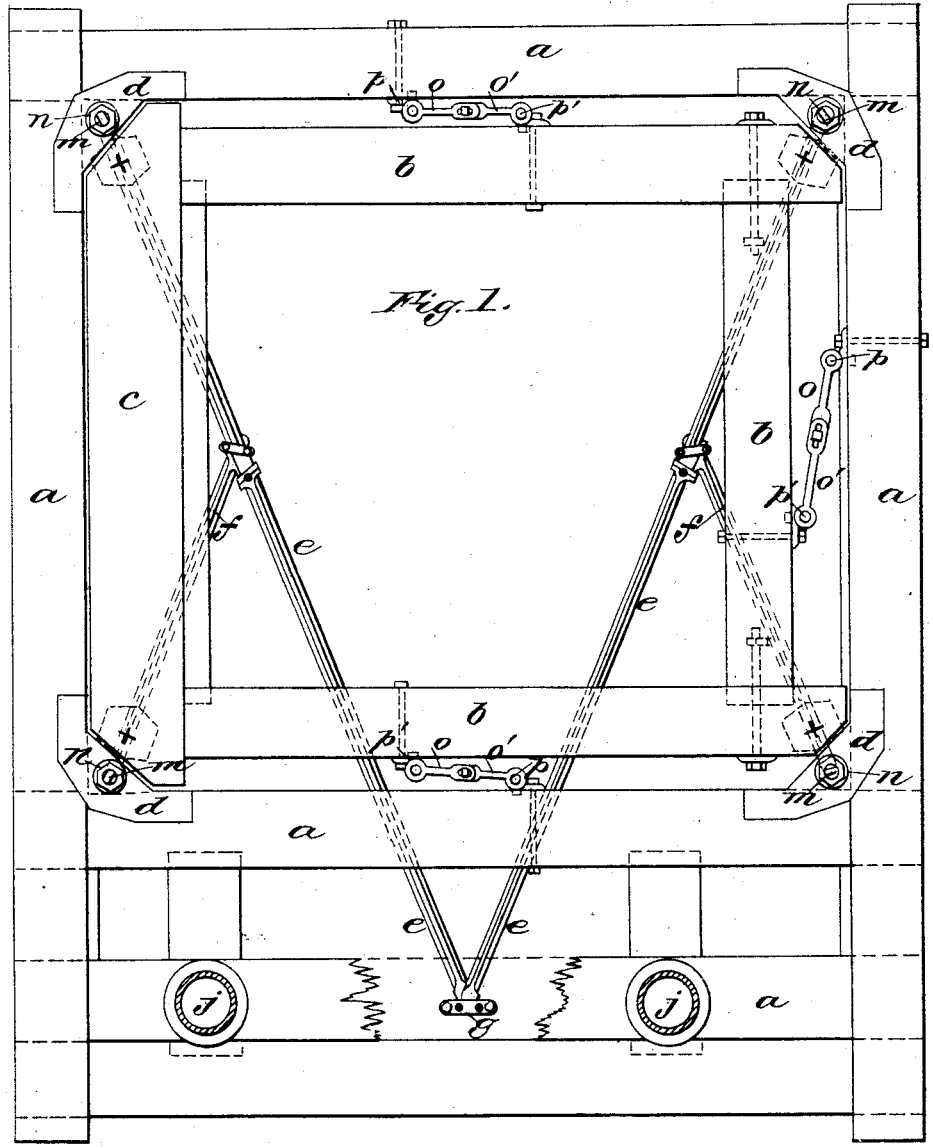

(No Model.) 2 Sheets—Sheet 1.

F. FAIRBANKS.
PLATFORM SCALE.

No. 285,600. Patented Sept. 25, 1883.

Witnesses:
Henry F. Parker
Jno. E. Gavin

Inventor:
Franklin Fairbanks
by Chas. M. Higgins
Attorney (No Model.) 2 Sheets—Sheet 2.
F. FAIRBANKS.
PLATFORM SCALE.
No. 285,600. Patented Sept. 25, 1883.
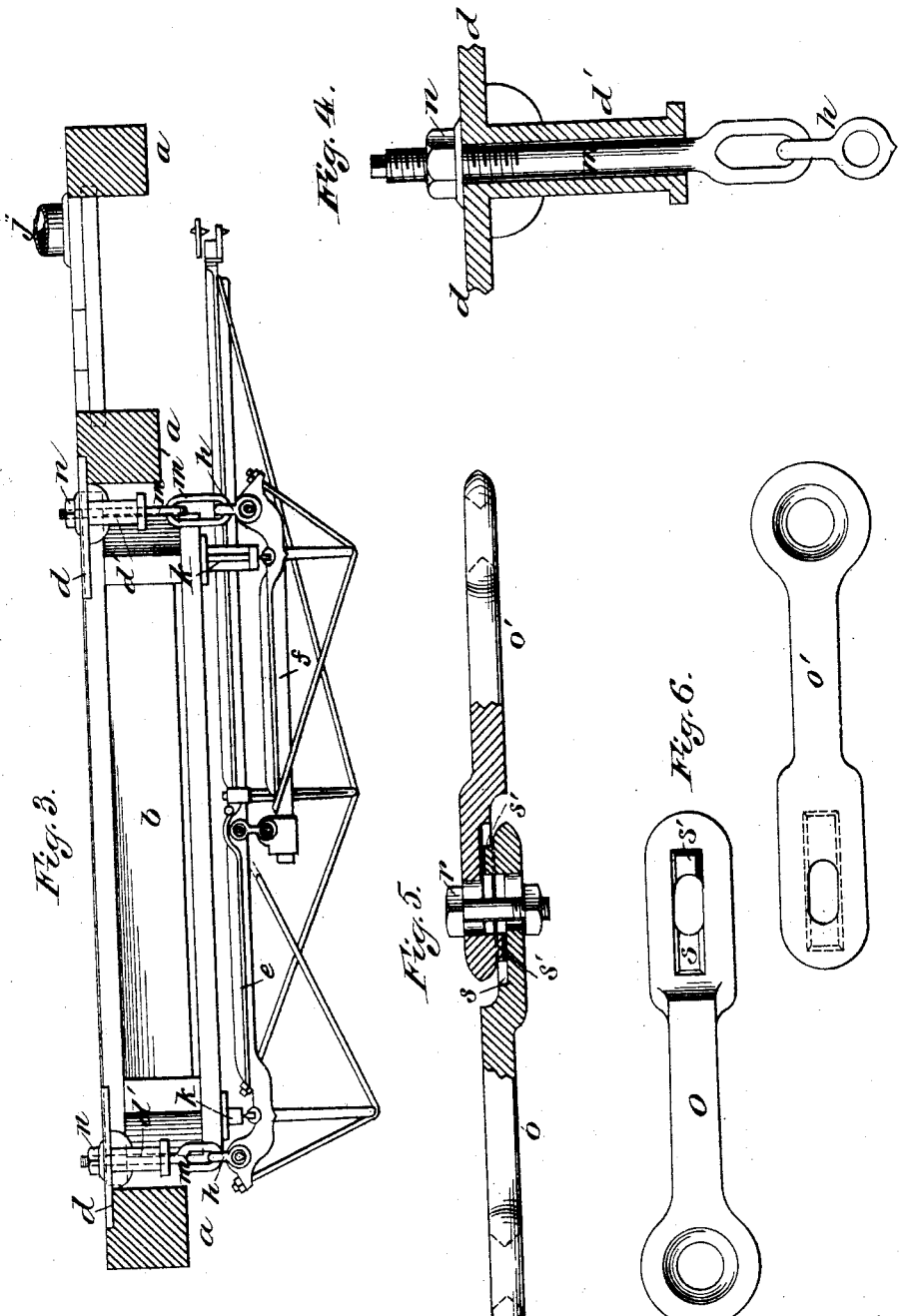

UNITED STATES PATENT OFFICE.

FRANKLIN FAIRBANKS, OF ST. JOHNSBURY, VERMONT, ASSIGNOR TO E. & T. FAIRBANKS & CO., OF SAME PLACE.

PLATFORM-SCALE.

SPECIFICATION forming part of Letters Patent No. 285,600, dated September 25, 1883.

Application filed May 10, 1883. (No model.)

*To all whom it may concern:*

Be it known that I, FRANKLIN FAIRBANKS, of St. Johnsbury, Caledonia county, Vermont, have invented certain new and useful Improvements in Platform-Scales, of which the following is a specification.

The invention here specified relates more especially to that class of scales termed "hopper-scales," adapted for weighing grain in elevators or other structures, in which a large hopper is mounted on the platform to receive the grain, the neck of the hopper projecting through the platform to the floor below, and provided with a gate which may be closed to retain the grain during the operation of weighing, and which is afterward opened to discharge the weighed grain into bins or other receptacles. Scales of this class are usually erected in the top of elevators, and are found to be subject to considerable derangement by reason of the alternate settling and rising of the building due to the loading and unloading of the structure. When the building is fully loaded with grain and afterward emptied, or when a great weight of grain is shifted from bin to bin, such different deflections occur in the floors and other parts of the structure as to throw the hopper, platform, and levers of the scale out of level, in which position they will record inaccurate results, and which has therefore been a source of considerable trouble in the operation of hopper-scales in elevators. Heretofore, in order to correct this defect and restore the parts of the scale to a level position, it has been usual to raise the "corner-irons" of the scale by the aid of jacks, and put blocks or wedges under the same, in order to bring the pivots of the levers which are suspended from the corner-irons into a level position, notwithstanding the deflections of the building. This method is obviously crude, temporary, and troublesome, and has to be frequently resorted to, and the aim of my invention is therefore to so construct the scales that the pivot-loops or fulcrum-hangers of the platform-levers may be adjusted up or down at the corner-irons, thus leveling the scale in an accurate and convenient manner without disarranging any of the mechanism of the scale. I therefore make the pivot-loops or suspending-stirrups vertically adjustable in the corner-irons, and capable of being thus adjusted from the top or exterior of the corner-iron, whereby the desired result is thus accomplished in a simple and effective manner.

My present invention therefore consists, chiefly, in the feature above outlined, and also in the special construction of the parts, as well as in adjustable check-rods used in connection with the aforesaid adjustable hangers, as hereinafter fully set forth.

Figure 2:
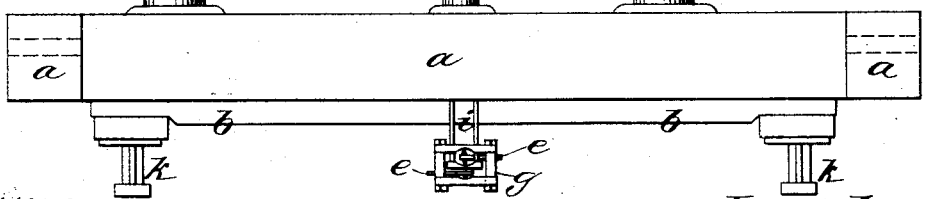

In the drawings annexed, Figure 1 is a plan view of the frame, platform, and underlying mechanism of a hopper-scale, some of the parts being broken away, the hopper and a portion of the flooring-timbers of the platform being removed. Fig. 2 is an elevation of the lower end of Fig. 1. Fig. 3 is a longitudinal sectional elevation of the scale. Fig. 4 is an enlarged fragmentary section of the corner-iron with its adjustable pivot suspending loop. Fig. 5 is a longitudinal sectional elevation of one of the adjustable check-rods. Fig. 6 is a plan view of the two parts of the check-rod separated.

In Figs. 1, 2, and 3, *a a* indicate the timbers which form the fixed frame-work of the platform-scale, and which are fixed to the floor or embodied in the structure of the elevator in the usual manner.

*b b* indicate the frame of the platform, which is inclosed by the fixed frame *a* in the usual manner, as illustrated.

The platform-frame *b* is covered over with planks *c*, one only of which is shown in place in Fig. 1, and on these planks the hopper rests, the neck passing through the center between the underlying levers, and projecting down into the lower story in the usual manner. This hopper, as well as the greater portion of the planking, is removed in Fig. 1, as these parts are presumed to be of the ordinary construction, well known to scale-builders, and require no illustration here.

Now, at each of the four corners of the fixed frame *a*, and contiguous to the four corners of the platform *b*, is fixed a corner-iron, *d*, as usual, from the under side of which are hung the pivot loops or stirrups *h*, (see Fig. 3,) in which the main levers *e e f f*, underlying the platform, are pivoted, and thus supported on and suspended from the fixed frame at each corner of the platform, according to the usual construction in scales of this class. Two of these levers, e e, are long, and two, f f, are short, as shown. The long pair e e radiate from the far corners of the platform and meet together in the form of a V under the "beam-cupboard," (not shown,) and their ends project into and bear upon the usual form of stirrup, g, and on the bail of the steelyard-rod i, which connects to the beam above the frame in the usual manner, which is not here illustrated.

The beam, with its cupboard, &c., is supported, as usual, on the pillars j j, which are shown broken away in Figs. 1, 2, and 3. The short pair of levers f f radiate from the opposite corners of the platform at an opposite inclination to the long levers e e, and at a level below said levers, and are coupled with said levers at a radius equal to their own length from the fulcrum-pivots of said levers, as seen in Figs. 1 and 3.

Under each corner of the platform is fixed a bearing-plate, k, which plates rest on the respective bearing-pivots of the respective levers, as shown best in Figs. 3 and 2. The platform thus rests wholly on the coupled levers e f, its weight being distributed in an evenly-disposed manner thereon, and is thus transmitted through said levers to the beam in the usual manner, as will be understood.

We will now consider, particularly, the construction of the corner-irons and the pivot-suspending rods or loops, in which the chief novelty lies, and to this end reference may be had to Figs. 1, 3, and 4.

In Fig. 1 it will be seen that the corner-irons are of approximately right-angled crescent shape, and are mortised in each corner of the fixed frame a, so as to be flush with the timbers thereof, and are suitably bolted thereto, leaving the middle portions of the plates overhanging the corners of the platform-pit, while the corners of the platform are beveled off to be free of said plates, as illustrated. Now, from the under side of this overhanging part of the plates or corner-irons a strong sleeve or tube, d', projects downwardly at suitable distance over the fulcrum-points of the levers, and in this tube is inclosed a strong rod or spindle, m, which is an easy-working fit therein. From the lower end of these rods m m are suspended the pivot-loops h h, in which the fulcrum-pivots of the levers e f are supported, as shown best in Fig. 3, while the upper end of the rod protrudes from the tubes above the corner-iron, and is threaded and provided with a nut, n, which is screwed down thereon and rests upon the smooth, level top of the corner-iron, as fully shown in Figs. 3, 2, and 1.

By referring to Fig. 3, it will be seen that the fulcrum-loops h of the long levers e e are suspended directly from an eye on the end of the suspender-rod m, while the fulcrum-loops of the short lever f are suspended from an intermediate link, m', connected with the eye on the suspender-rod, in order to reach the lower level of the short pair of levers.

By referring to Fig. 4, it will be noted that the top of the suspender-rod m is squared or otherwise adapted for the grasp of a wrench, while the nut n is formed with a broad round base, which takes an extended bearing upon the top of the corner-iron.

The construction of the aforesaid parts is therefore such that the nuts n of the suspender-rods m, resting on the top of the corner-irons d, sustain the underlying system of levers and the platform which rests thereon, as seen in Fig. 3, so that consequently by turning said nuts back or forth the levers and platform may be raised or lowered to any desired adjustment. It will therefore be obvious that if the platform and levers be out of level, then by turning the nuts up or down at the proper corners the platform may be at once adjusted to a true level in a very quick, simple, and accurate manner, thereby accomplishing the important object before named in a manner which is a great improvement over the method heretofore resorted to. The said adjustment may of course be easily made by means of two wrenches, one of which should grasp the square top of the suspender-rod to hold it from turning, while the second wrench turns the nut in one way or the other, as will be understood.

If desired, in order to obviate the use of two wrenches, the suspender-rod may be longitudinally grooved to slide on a key in the sleeve d', so as to allow the rod to rise or fall under the action of the nut m, but prevent the rod from turning, so that one wrench applied to turn the nut will thus adjust the rod; but this construction would be more expensive, and I therefore prefer the simple construction first described, as I find that the desired adjustment may be made with two wrenches with sufficient ease.

It may now be readily appreciated that hopper-scales will be greatly improved and rendered much more durable and accurate in their workings by being provided with this simple means of adjustment, whereby a simple external manipulation at each corner of the platform-casing will serve to restore the levers to a level position, should they at any time depart from it, without requiring to open, remove, or derange any of the parts of the scales, thus obviating or neutralizing the great source of inaccuracy and annoyance heretofore experienced from the settling or deflections of the elevator or other structure in which the scales are erected.

I do not of course confine myself to any special device for supporting the suspender-rod m in the corner-iron and rendering it externally adjustable therein, for in lieu of the nut n, which acts as such supporting and adjusting device, any equivalent device may be employed without departing from the substance of the invention.

I might here mention that the sleeve d' of the corner-iron might be threaded as a nut, and the rod $m$ screwed into the same and swiveled at its lower end at its connection with the fulcrum-loop $h$, so that by turning the rod at the top it would be screwed up or down in the sleeve without turning the fulcrum-loop. Several other slight modifications might be adopted without altering the principle of the invention; but I prefer the precise construction illustrated.

The platform $b$ is, as usual, linked to the inclosing-frame $a$ on each of its four sides by the check-rods $o\ o'$, as seen best in Fig. 1, so as to prevent the platform from shifting out of place or moving off the pivots of the levers. These check-rods are formed, as usual, with an eye at each end, which eyes are slipped over pintled lugs $p\ p'$, one on the fixed frame and one on the platform, as illustrated. According to one feature of my invention, these check-rods are by a special construction made adjustable in length, whereby they can be better fitted in place when the scale is first erected, and may be afterward contracted or extended in length slightly to allow for any settling, deflection, or warping of the structure of the scale. The construction of the rods is shown best in Figs. 5 and 6, from which it will be seen that they are made in two sections, $o\ o'$, which overlap at the middle of the rod, and are formed with a slot, through which the stem of a clamp-bolt, $r$, passes, the head of which bears on the face of one section, and the nut on the face of the other section, so that by loosening the nut the sections may be slid in or out on each other, and the rod thus contracted or extended to the desired extent, after which the nut is tightened to hold the sections firmly at the desired adjustment. The lapping face of each section is formed with a guiding-groove, $s$, coincident with the slot, and with a projection, $s'$, at the end of the groove, so that when the sections are put together the projection on one part fits into the groove on the other, and thus holds the sections in true line with each other, and guides one upon the other in the adjusting movement, as will be understood.

When the suspender-rods are adjusted at the corner-irons so as to level the scale, as before described, the check-rods will in extreme cases also require to be adjusted slightly, so as to correspond to the altered position of the platform, and prevent the binding of the eyes of the rods on the lugs $p\ p'$. By the means described it will be seen that the rods may be readily adjusted in length, and in order to adjust them in height or to a level position it will be only necessary to slip washers under either end of the rod on the pintles of the lugs $p$ or $p'$, as will be readily appreciated, so that by these combined features I thus provide all the adjustment necessary to correct derangements which ordinarily arise in scales of this class.

The corner-irons $d$ are preferably made of strong castings of iron or other metal, with the sleeve $d'$ integral with the top plate, and strengthened by flanges, as indicated in Fig. 4.

What I claim is—

1. In a platform-scale, the combination, with the fixed corner irons or supports for the underlying platform lever mechanism, of fulcrum pivot hangers vertically adjustable in said corner-irons, with an externally adjusting and sustaining device on said corner-irons, whereby the underlying levers may be leveled by an external manipulation at the corner-irons of the scale, substantially as herein set forth.

2. The combination, in a platform-scale, with the supporting corner irons or brackets, $d$, formed with the sleeve or socket $d'$, of the fulcrum suspending-rods $m$, fitting said socket, and means for sustaining and vertically adjusting said rods therein, substantially as and for the purpose set forth.

3. The combination, in a platform-scale, with the corner-irons $d$, formed with socket $d'$, of the fulcrum suspender-rod $m$, fitting therein, and threaded and protruding at its upper end, and provided with the external nut, $n$, substantially as and for the purpose set forth.

4. In a platform-scale, a longitudinally-adjustable check-rod formed in two oversliding sections, $o\ o'$, overlapping at the middle, and provided with a clamp-bolt, $r$, substantially as herein shown and described.

5. In a platform-scale, the adjustable check-rod $o\ o'$, formed in two slotted overlapping sections, having the engaging guiding-projections $s'\ s'$, and provided with the clamp-bolt $r$, substantially as and for the purpose set forth.

FRANKLIN FAIRBANKS.

Witnesses:
F. M. ALLEMAND,
J. H. SIMMONS.